(12) United States Patent
Bodary (10) Patent No.: US 9,677,661 B2
(45) Date of Patent: Jun. 13, 2017

(54) AXLE ASSEMBLY HAVING A BALLAST INSERT

(71) Applicant: ArvinMeritor Technology, LLC, Troy, MI (US)

(72) Inventor: Andrew Bodary, Shelby Township, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 14/853,309

(22) Filed: Sep. 14, 2015

(65) Prior Publication Data

US 2017/0074389 A1 Mar. 16, 2017

(51) Int. Cl.
| F16H 57/04 | (2010.01) |
| B60B 35/16 | (2006.01) |
| F16H 57/037 | (2012.01) |
| F16H 48/08 | (2006.01) |

(52) U.S. Cl.
CPC ....... *F16H 57/0423* (2013.01); *B60B 35/163* (2013.01); *F16H 48/08* (2013.01); *F16H 57/037* (2013.01); *F16H 57/0483* (2013.01)

(58) Field of Classification Search
CPC .................................................. F16H 57/0423
See application file for complete search history.

(56) References Cited

U.S. PATENT DOCUMENTS

| 1,966,434 | A | * | 7/1934 | Barker ................ F16H 57/0483 |
| | | | | 475/160 |
| 2,242,195 | A | | 5/1941 | Teker et al. |
| 5,505,112 | A | | 4/1996 | Gee |
| 5,540,300 | A | | 7/1996 | Downs et al. |
| 5,839,327 | A | | 11/1998 | Gage |
| 6,132,329 | A | | 10/2000 | Tison |
| 6,938,731 | B2 | | 9/2005 | Slesinski |
| 8,627,928 | B2 | | 1/2014 | Sowul et al. |
| 8,858,381 | B2 | | 10/2014 | Trost |
| 8,961,348 | B2 | | 2/2015 | Weber et al. |
| 8,974,342 | B2 | | 3/2015 | Kwasniewski et al. |
| 2004/0149519 | A1 | | 8/2004 | Slesinski |
| 2012/0316024 | A1 | | 12/2012 | Weber et al. |
| 2015/0219206 | A1 | | 8/2015 | Trost |

FOREIGN PATENT DOCUMENTS

| DE | 710894 C | 9/1941 |
| DE | 102010010816 A1 | 9/2011 |
| EP | 1375970 A2 | 1/2004 |
| EP | 2660493 A1 | 11/2013 |
| EP | 3098479 A2 | 11/2016 |

(Continued)

OTHER PUBLICATIONS

U.S. Appl. No. 14/696,542, filed Apr. 27, 2015.

(Continued)

*Primary Examiner* — Derek D Knight
(74) *Attorney, Agent, or Firm* — Brooks Kushman P.C.

(57) ABSTRACT

An axle assembly having an axle housing, a differential, and a ballast insert. The ballast insert may be disposed in the axle housing below the differential. The differential may have a ring gear. The ring gear may be received in a trench that may be provided in the ballast insert.

20 Claims, 4 Drawing Sheets

(56) References Cited

FOREIGN PATENT DOCUMENTS

JP        S5937462 U      3/1984
JP      2012210839 A    11/2012

OTHER PUBLICATIONS

European Patent Office, Extended European Search Report for the corresponding European Patent Application No. 16182687.0 dated Apr. 4, 2017.
Australian Government IP Australia, Examination Report No. 1 for standard patent application for the corresponding Australian Patent Application No. 2016210769, dated Mar. 23, 2017.

* cited by examiner

AXLE ASSEMBLY HAVING A BALLAST INSERT

TECHNICAL FIELD

This disclosure relates to an axle assembly that has a ballast insert.

BACKGROUND

An axle assembly lubrication apparatus is disclosed in U.S. Pat. No. 6,132,329.

SUMMARY

In at least one embodiment, an axle assembly is provided. The axle assembly may include an axle housing and a ballast insert. The axle housing may have a center portion that may receive a differential that may have a ring gear. The ballast insert may be disposed in the center portion below the differential. The ballast insert may include a lower surface, first and second end surfaces, first and second upper surfaces, and a trench. The lower surface may be disposed on the center portion. The first and second end surfaces may extend from opposite ends of the lower surface. The first and second upper surfaces may extend from the first and second end surfaces, respectively. The trench may be disposed between the first and second upper surfaces. The ring gear may be received in the trench.

In at least one embodiment, an axle assembly is provided. The axle assembly may include an axle housing and a ballast insert. The axle housing may have a center portion that may receive a differential that may have a ring gear. The ballast insert may be disposed in the center portion below the differential. The ballast insert may include a lower surface, first and second end surfaces, first and second upper surfaces, a trench, and an intermediate upper surface. The lower surface may be disposed on the center portion. The first and second end surfaces may extend from the lower surface. The first and second upper surfaces may extend from the first and second end surfaces, respectively. The trench may be disposed between the first upper surface and the second upper surface. The intermediate upper surface may extend from the first upper surface to the trench and may at least partially define a wing that may extend from the ballast insert.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
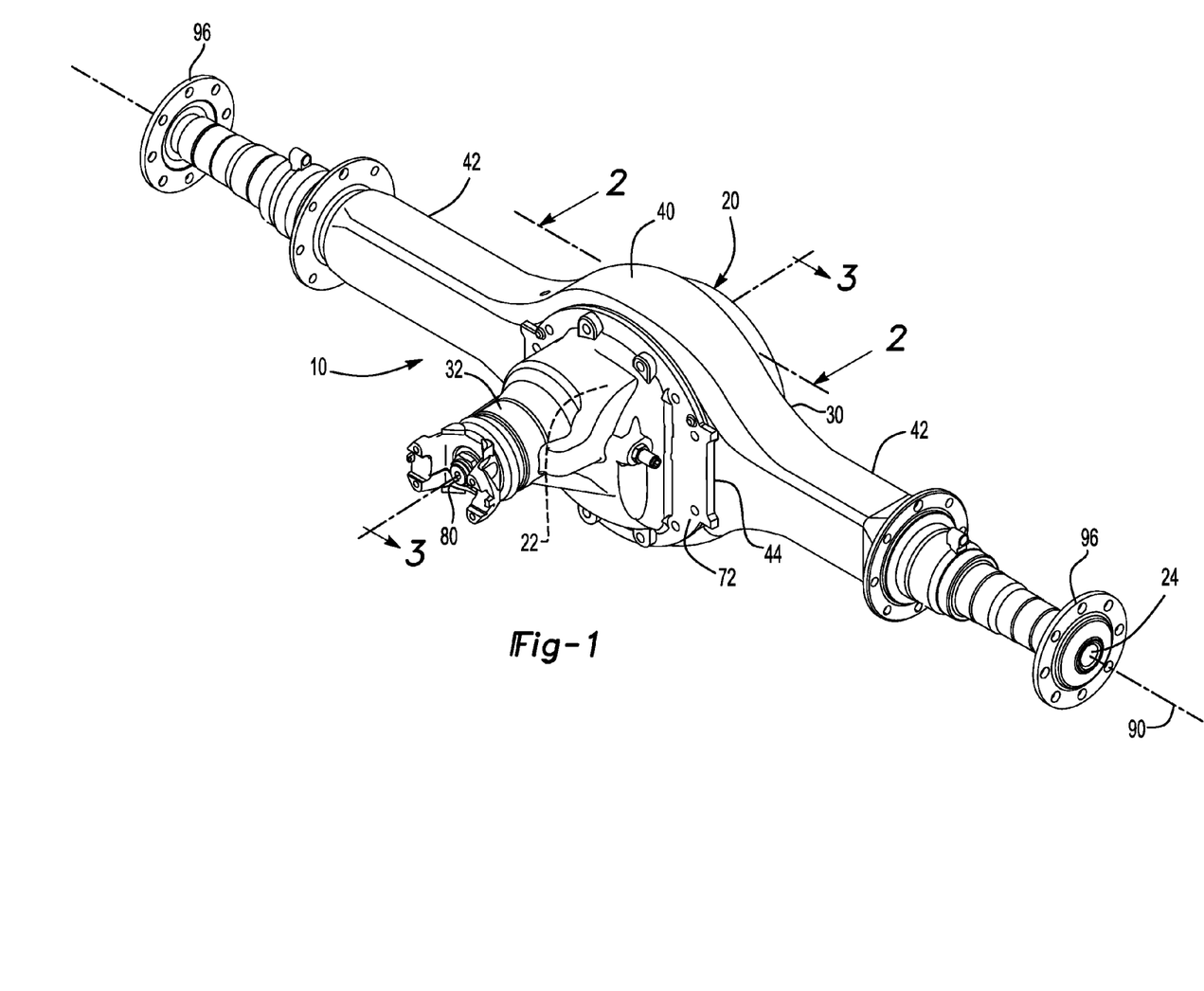
FIG. 1 is a perspective view of an axle assembly.

Referring to FIG. 1, an exemplary axle assembly 10 is shown. The axle assembly 10 may be provided with a motor vehicle like a truck, bus, farm equipment, mining equipment, military transport or weaponry vehicle, or cargo loading equipment for land, air, or marine vessels. The motor vehicle may include a trailer for transporting cargo in one or more embodiments.

The axle assembly 10 may be part of a vehicle drivetrain that may provide torque to one or more traction wheel assemblies that may include a tire mounted on a wheel. One or more axle assemblies 10 may be provided with the vehicle. For example, the axle assembly 10 may be a single drive axle assembly or may be configured as part of a tandem axle configuration or multi-axle configuration that may include a plurality of axle assemblies that may be connected in series. As is best shown with reference to FIGS. 1 and 2, the axle assembly 10 may include a housing assembly 20, a differential 22, at least one axle 24, and a ballast insert 26.

Figure 2:
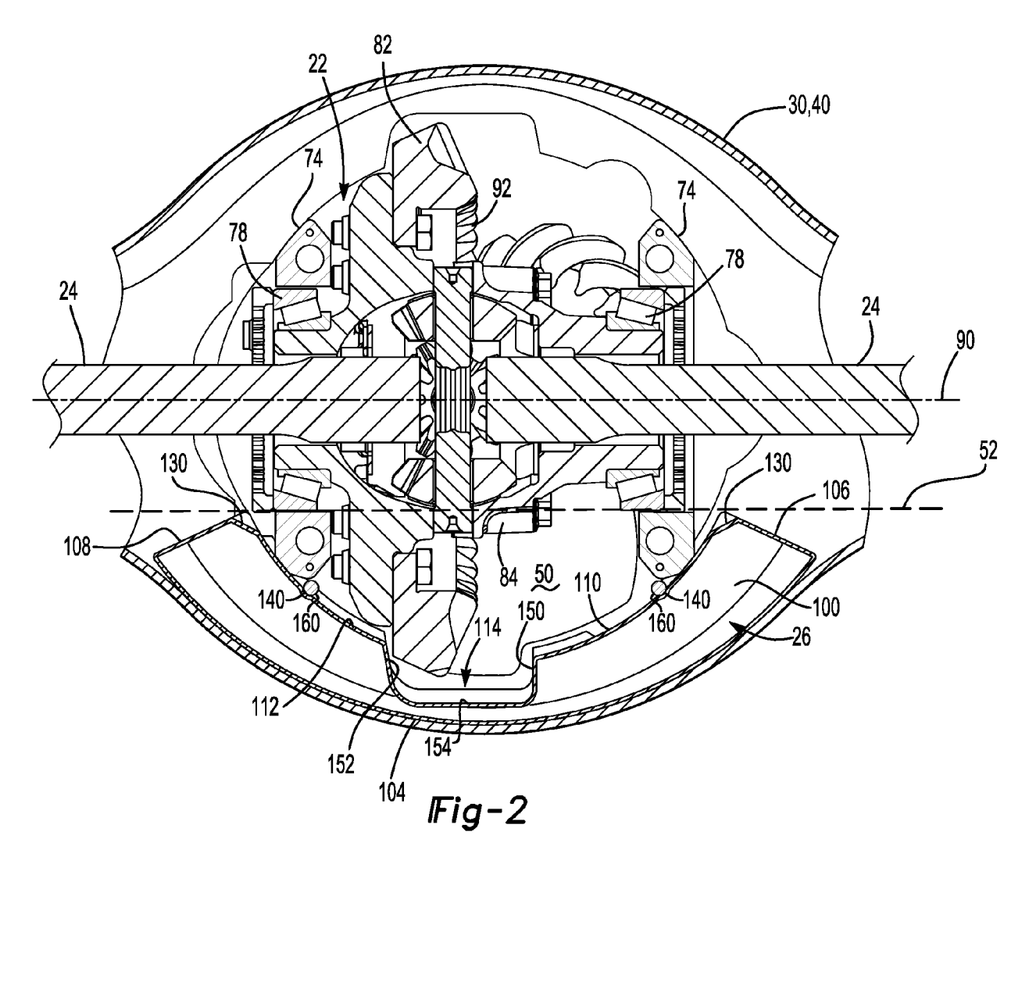
FIG. 2 is a section view of the axle assembly along section line 2-2.

The housing assembly 20 may receive various components of the axle assembly 10. In addition, the housing assembly 20 may facilitate mounting of the axle assembly 10 to the vehicle. The housing assembly 20 may include an axle housing 30 and a differential carrier 32.

The axle housing 30 may receive and support the axles 24. In at least one embodiment, the axle housing 30 may include a center portion 40, at least one arm portion 42, and a carrier housing mounting surface 44.

The center portion 40 may be disposed proximate the center of the axle housing 30. The center portion 40 may define a cavity that may receive the differential 22 and the ballast insert 26. As is best shown in FIG. 2, a region of the center portion 40 or cavity located below the differential 22 may at least partially define a sump portion 50 that may contain lubricant 52. Splashed lubricant may flow down the sides of the center portion 40 and may flow over internal components of the axle assembly 10 and gather in the sump portion 50. The lubricant 52, which may be a liquid such as oil, may lubricate components of the axle assembly 10, such as the differential 22 and various bearings. In FIG. 2, the level of the lubricant 52 is merely exemplary; the lubricant 52 may fill more of the center portion 40 of the axle housing 30 and may substantially or completely submerge the ballast insert 26 under various operating conditions.

Figure 3:
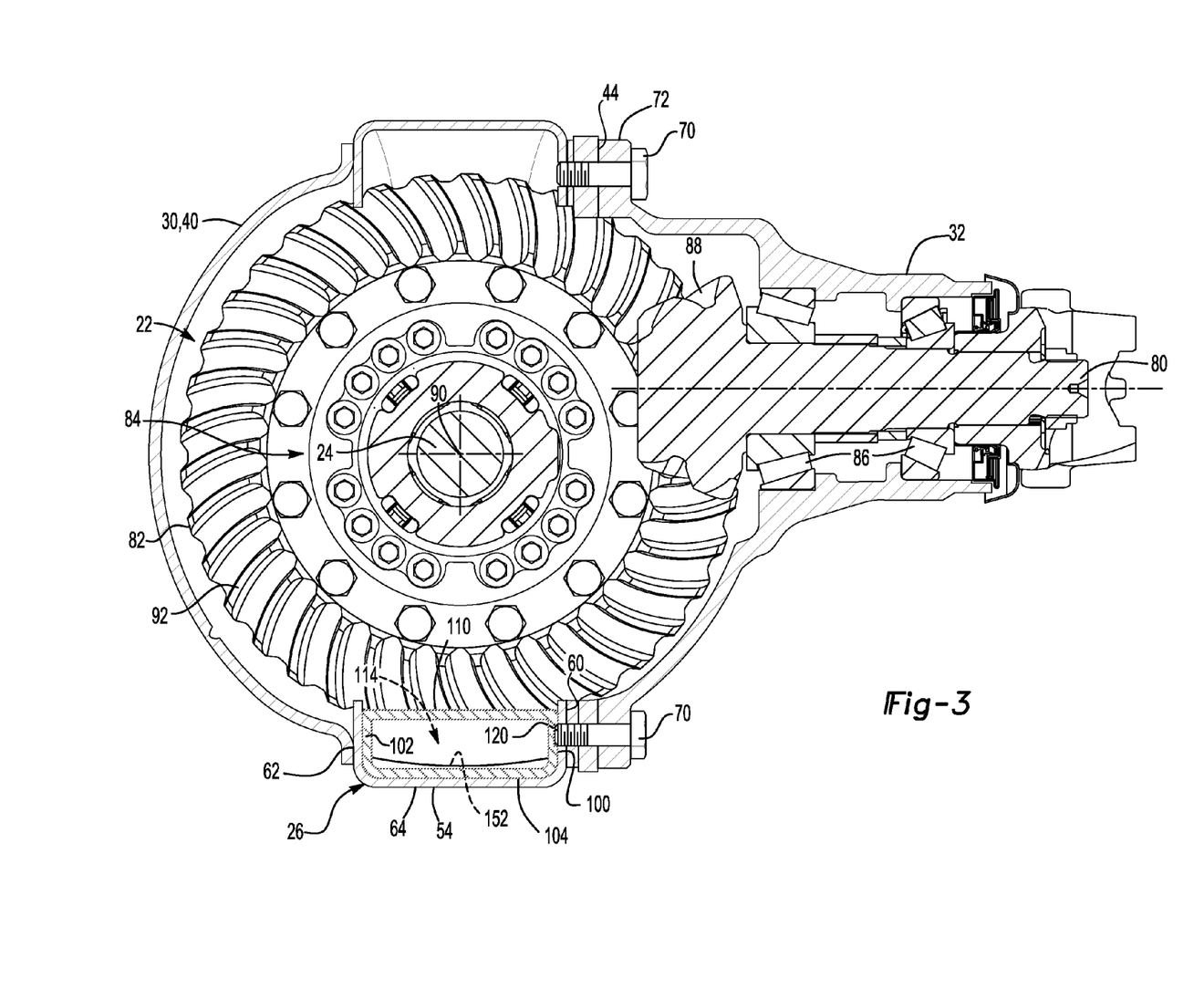
FIG. 3 is a section view of the axle assembly along section line 3-3.

Referring to FIG. 3, the center portion 40 may have a housing trench 54 that may receive and position the ballast insert 26. The housing trench 54 may extend along the bottom of the center portion 40 and may be configured as a recess that may be disposed below the differential 22 and that may extend away from the differential 22. The housing trench 54 may extend between the arm portions 42 and may be disposed directly below the axles 24. In at least one embodiment, the housing trench 54 may have a first side wall 60, a second side wall 62, and a bottom wall 64.

The first side wall 60 may be disposed proximate and may engage the differential carrier 32. The first side wall 60 may also facilitate mounting of the differential carrier 32. For instance, the first side wall 60 may have a set of holes that may be aligned with corresponding holes on the differential carrier 32. These holes may receive a corresponding fastener 70, such as a bolt, that may couple the differential carrier 32 to the axle housing 30.

The second side wall 62 may be disposed opposite the first side wall 60. In addition, the second side wall 62 may be completely spaced apart from the first side wall 60.

The bottom wall 64 may extend from the first side wall 60 to the second side wall 62. The bottom wall 64 may at least partially define a bottom surface of the axle housing 30.

Referring to FIG. 1, one or more arm portions 42 may extend from the center portion 40. For example, two arm portions 42 may extend in opposite directions from the center portion 40 and away from the differential 22. The arm portions 42 may have substantially similar configurations. For example, the arm portions 42 may each have a hollow configuration or tubular configuration that may extend around the corresponding axle 24 and may help separate or isolate the axle 24 from the surrounding environment. An arm portion 42 or a portion thereof may be integrally formed with the center portion 40 in one or more embodiments. Each arm portion 42 may define an arm cavity that may receive a corresponding axle 24. The arm portion 42 and arm cavity may be disposed above the sump portion 50 in one or more embodiments.

Referring to FIGS. 1 and 3, the carrier housing mounting surface 44 may face toward and may engage the differential carrier 32. The carrier housing mounting surface 44 may facilitate mounting of the differential carrier 32 to the axle housing 30. For example, the carrier housing mounting surface 44 may have a set of holes that may be aligned with corresponding holes on the differential carrier 32. Each hole may receive a fastener 70, such as a bolt, that may couple the differential carrier 32 to the axle housing 30.

The differential carrier 32, which may also be called a carrier housing, may be mounted to the center portion 40 of the axle housing 30. The differential carrier 32 may support components of the differential 22. In at least one embodiment, the differential carrier 32 may have a flange portion 72 and a bearing support 74.

The flange portion 72 may facilitate mounting of the differential carrier 32 to the axle housing 30. For example, the flange portion 72 may be disposed proximate and may engage the carrier housing mounting surface 44 of the axle housing 30 and may have a set of holes that may receive fasteners 70 as previously discussed.

Referring to FIG. 2, the bearing support 74 may receive a roller bearing assembly that may rotatably support the differential 22. In FIG. 2, two bearing supports 74 are shown that are located inside the center portion 40 on opposite sides of the differential 22. A bearing support 74 may include a pair of legs that extend from the differential carrier 32 and a bearing cap that may be mounted to the legs and that may arch over a roller bearing assembly. The legs and bearing cap may extend around the roller bearing assembly 78 and may cooperate to receive and secure the roller bearing assembly 78.

Referring to FIGS. 2 and 3, the differential 22 may be disposed in the housing assembly 20. The differential 22 may transmit torque to the vehicle fraction wheel assemblies and permit the traction wheel assemblies to rotate at different velocities. An input shaft 80, a ring gear 82, and a differential unit 84 are shown to facilitate an abbreviated discussion of the operation of the axle assembly 10 and differential 22.

The input shaft 80 may be coupled to a vehicle drivetrain component, such as a drive shaft, that may be coupled to an output of a vehicle transmission or transfer case, which in turn may receive torque from a vehicle power source, such as an engine or motor. Alternatively, the input shaft 80 may be operatively connected to an output of another axle assembly. The input shaft 80 may be rotatably supported by one or more roller bearings 86 that may be disposed in the differential carrier 32 and may be operatively connected to a drive pinion 88. The drive pinion 88 may provide torque to the ring gear 82.

The ring gear 82 may transmit torque the differential unit 84. For instance, the ring gear 82 may be mounted to or may be operatively connected to the differential unit 84. The ring gear 82 may rotate about an axis 90 and may have a set of teeth 92 that may arranged around the axis 90. The ring gear 82 may splash lubricant that accumulates in the sump portion 50 as it rotates. The ring gear 82 may also extend into the housing trench 54.

The differential unit 84 may be generally disposed in the center portion 40 of the axle housing 30 and may be configured to permit the axles 24 to rotate at different speeds. As is best shown in FIG. 2, the differential unit 84 may be rotatably supported by a pair of roller bearing assemblies 78 and may be connected to the axles 24. As such, the differential unit 84 may receive torque via the ring gear 82 and provide torque to the axles 24.

The axles 24 may transmit torque from the differential 22 to corresponding traction wheel assemblies. In FIG. 2, two axles 24 are provided such that each axle 24 extends through a different arm cavity. The axles 24 may extend along and may be rotated about the axis 90 by the differential 22. Each axle 24 may have a first end and a second end. The first end may be coupled to the differential 22. The second end may be disposed opposite the first end and may be located outside of the arm portion 42 of the axle housing 30. As shown in FIG. 1, an axle flange 96 may be disposed proximate the second end of the axle 24 and may facilitate mounting of a wheel end assembly and traction wheel assembly.

Figure 4:
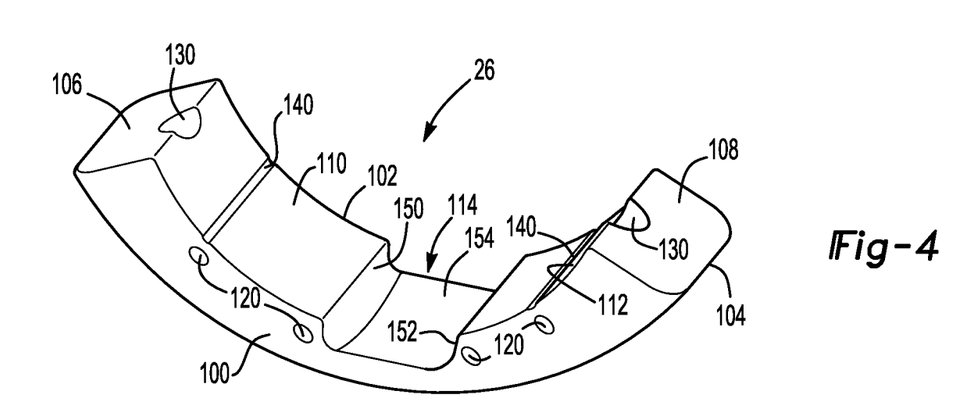
FIG. 4 is a perspective view of a ballast insert.

Referring to FIGS. 2-4, the ballast insert 26 may be disposed in the center portion 40 below the differential 22. The ballast insert 26 may at least partially fill the housing trench 54 and may reduce the volume of lubricant 52 in the sump portion 50 and more specifically in the housing trench 54. As such, the ballast insert 26 may take up space in the housing trench 54 that would otherwise receive or be filled with lubricant if the ballast insert 26 was not provided. In addition, less oil volume is needed to fill the oil level of the axle assembly to a desired height or given height as compared to providing the axle assembly without the ballast insert 26. Reducing the volume of lubricant in the sump portion 50 may reduce churning losses or frictional drag that may be exerted upon the ring gear 82 by the lubricant 52 and may improve operating efficiency of the axle assembly 10 and vehicle fuel economy. The term ballast insert employs the word "ballast" primarily with reference to its location at the bottom of the housing assembly 20 and that it fills in at least a portion of the bottom of the housing assembly 20 or housing trench 54, rather than in the context of ballast that provides stability.

The ballast insert 26 may be configured as an enclosed hollow tank that may not receive or store lubricant. Alternatively, the ballast insert 26 may not be hollow, but instead may be a solid part that may not have a chamber or cavity that receives or stores lubricant. The ballast insert 26 may be made of any suitable material. For example, the ballast insert 26 may be made of a metal alloy or a polymeric material, which may allow the ballast insert 26 to be formed into complex shapes and may help reduce cost and weight. In addition, the ballast insert 26 may be spaced apart from the ring gear 82 and may be configured to help strip excess oil from the ring gear 82 to help decrease windage losses and reduce rotating mass on the ring gear 82.

The ballast insert 26 may be provided in various configurations. As is best shown in FIG. 4, the ballast insert 26 may include a first side surface 100, a second side surface 102, a lower surface 104, a first end surface 106, a second end surface 108, a first upper surface 110, a second upper surface 112, and a trench 114.

The first side surface 100 may face toward and may engage the first side wall 60 of the housing trench 54 as is best shown in FIG. 3. As is best shown in FIG. 4, the first side surface 100 may have one or more indentations 120 that may extend toward the second side surface 102. Each indentation 120 may receive an end of a corresponding fastener 70 that may extend through the first side wall 60. The indentations 120 may be configured as blind holes and may be disposed between and may be spaced apart from the lower surface 104 and a surface disposed opposite the lower surface 104, such as the first upper surface 110 or the second upper surface 112.

The second side surface 102 may be disposed opposite the first side surface 100. The second side surface 102 may face toward and may engage the second side wall 62 of the housing trench 54 as is best shown in FIG. 3. As such, the ballast insert 26 may extend from the first side wall 60 to the second side wall 62. The second side surface 102 may be disposed substantially parallel to the first side surface 100 in one or more embodiments.

The lower surface 104 may extend from the first side surface 100 to the second side surface 102. The lower surface 104 may be disposed on the center portion 40. For example, the lower surface 104 may be disposed on the bottom wall 64 of the housing trench 54 as is best shown in FIG. 3. As is best shown in FIG. 4, the lower surface 104 may extend along an arc and may follow the contour of the bottom wall 64.

The first end surface 106 may be disposed at a first end of the ballast insert 26. The first end surface 106 may extend from a first end of the lower surface 104 to a first end of the first upper surface 110. The first end surface 106 may also extend from the first side surface 100 to the second side surface 102. A lubricant trough 130 may be associated with the first end surface 106. The lubricant trough 130 may help direct lubricant from the first end surface 106 toward the trench 114. The lubricant trough 130 may be configured as a recess that may be disposed in the first end surface 106 and may extend from the first end surface 106 to the first upper surface 110.

The second end surface 108 may be disposed opposite the first end surface 106. The second end surface 108 may be disposed at a second end of the ballast insert 26. The second end surface 108 may extend from a second end of the lower surface 104 to a first end of the second upper surface 112. The second end surface 108 may also extend from the first side surface 100 to the second side surface 102. A lubricant trough 130 may also be associated with the second end surface 108. The lubricant trough 130 may help direct lubricant from the second end surface 108 toward the trench 114. The lubricant trough 130 may be configured as a recess that may be disposed in the second end surface 108 and may extend from the second end surface 108 to the second upper surface 112.

The first upper surface 110 may extend from the first end surface 106 to the trench 114. The first upper surface 110 may also extend from the first side surface 100 to the second side surface 102. The first upper surface 110 may include a groove 140 that may extend toward the lower surface 104. The groove 140 may extend from the first side surface 100, the second side surface 102, or both. In FIG. 4, the groove 140 extends from the first side surface 100 to the second side surface 102. The groove 140 may extend in a substantially linear manner from the first side surface 100 to the second side surface 102 in one or more embodiments.

The second upper surface 112 may be disposed opposite the first upper surface 110 and may be spaced apart from the first upper surface 110. The second upper surface 112 may extend from the second end surface 108 to the trench 114. The second upper surface 112 may also extend from the first side surface 100 to the second side surface 102. The second upper surface 112 may also include a groove 140 as previously described.

The trench 114 may be disposed between the first upper surface 110 and the second upper surface 112. For instance, the trench 114 may extend from the first upper surface 110 to the second upper surface 112. The trench 114 may be disposed closer to the lower surface 104 than the first upper surface 110 and the second upper surface 112. As is best shown in FIG. 2, the ring gear 82 may be received in the trench 114. In addition, the trench 114 may be spaced apart from the ring gear 82 so as to not interfere with rotation of the ring gear 82. As is best shown in FIG. 4, the trench 114 may have a first trench side surface 150, a second trench side surface 152, and a bottom trench surface 154.

The first trench side surface 150 may extend from the first upper surface 110 to the bottom trench surface 154. In addition, the first trench side surface 150 may extend from the first side surface 100 to the second side surface 102. As is best shown in FIG. 2, the teeth 92 of the ring gear 82 may face toward and may extend toward the first trench side surface 150.

The second trench side surface 152 may be disposed opposite the first trench side surface 150. The second trench side surface 152 may extend from the second upper surface 112 to the bottom trench surface 154. In addition, the second trench side surface 152 may extend from the first side surface 100 to the second side surface 102. As is best shown in FIG. 2, the ring gear 82 may be offset from the center of the trench 114 such that the ring gear 82 may be disposed closer to the second trench side surface 152 than the first trench side surface 150. In addition, the second trench side surface 152 may be disposed in a non-parallel relationship with the first trench side surface 150.

The bottom trench surface 154 may extend from the first trench side surface 150 to the second trench side surface 152. In addition, the bottom trench surface 154 may extend from the first side surface 100 to the second side surface 102. As is best shown in FIG. 3, the bottom trench surface 154 may extend along an arc between the first side surface 100 and the second side surface 102. As such, the bottom trench surface 154 may also extend along an arc between the first side wall 60 and the second side wall 62 of the housing trench 54.

The ballast insert 26 may be secured to the housing assembly 20 in various ways. The following examples of securing the ballast insert 26 may be employed individually or in any combination.

First, the ballast insert 26 may be secured to the housing assembly 20 via friction or an interference fit.

Second, the ballast insert 26 may be secured to the housing assembly 20 with an adhesive or other bonding agent.

Third, one or more braces 160 may secure the ballast insert 26 to the axle housing 30 as is best shown in FIG. 2. For instance, a brace 160 may from the first side wall 60 of the housing trench 54, the second side wall 62 of the housing trench 54, or from the first side wall 60 and the second side wall 62. The brace 160 may be disposed a corresponding groove 140 of the ballast insert 26, and may inhibit movement of the ballast insert 26 in multiple directions.

Fourth, one or more bearing supports 74 may secure the ballast insert 26 to the axle housing 30. A bearing support 74 may engage an adjacent surface of the ballast insert 26. For instance, a first bearing support 74 may engage the first upper surface 110 and the second bearing support 74 may engage the second upper surface 112 as is best shown in FIG. 2.

Figure 5:
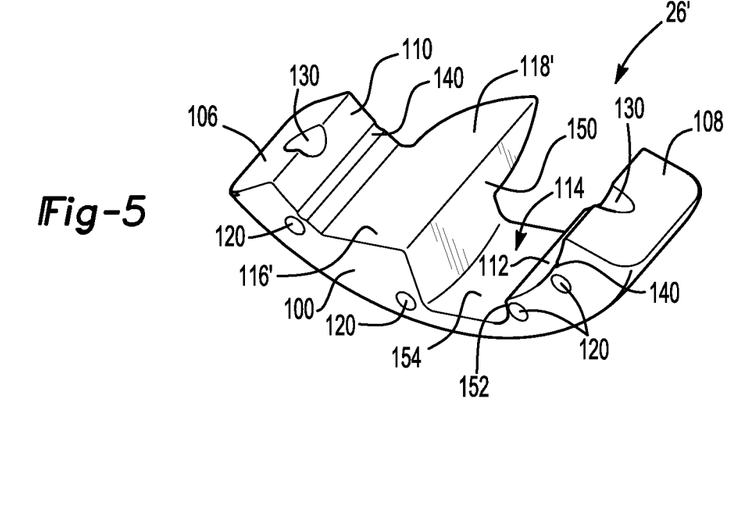
FIG. 5 is a perspective view of another version of a ballast insert.

Referring to FIG. 5, another version of a ballast insert 26' is shown. The ballast insert 26' may have a first side surface 100, a second side surface 102, a lower surface 104, a first end surface 106, a second end surface 108, a first upper surface 110, a second upper surface 112, and a trench 114, and an intermediate upper surface 116'. The first side surface 100, a second side surface 102, a lower surface 104, a first end surface 106, a second end surface 108, and second upper surface 112 may be identical or substantially similar to the surfaces of the ballast insert 26 shown in FIG. 4. The first upper surface 110 may extend from the first end surface 106 to the intermediate upper surface 116' rather than to the trench 114.

The intermediate upper surface 116' may extend from the first upper surface 110 to the trench 114. As such, the intermediate upper surface 116' may be disposed closer to ring gear 82 and the trench 114 than the first upper surface 110 and may be disposed further from the lower surface 104 than at least a portion of the second upper surface 112. The intermediate upper surface 116' may at least partially define a wing 118' that may extend from the ballast insert 26'.

The wing 118' may extend outwardly away from the second side surface 102 and may be disposed on the center portion 40 of the axle housing 30. The wing 118' may effectively lengthen the trench 114, displace an additional volume of lubricant 52 from the sump portion 50, and may help direct lubricant flow proximate the trench 114 and the ring gear 82. The wing 118' may also be partially defined by the first trench side surface 150, which may extend outwardly past the second side surface 102 and the bottom trench surface 154. As such, the ring gear 82 may be positioned such that its back side faces toward the second trench side surface 152 and the away the intermediate upper surface 116' and wing 118' while the teeth 92 of the ring gear 82 may extend toward the first trench side surface 150 and the wing 118'. The ring gear 82 may be offset from the center of the trench 114 such that the ring gear 82 may be disposed closer to the second trench side surface 152 than the first trench side surface 150 as previously discussed. As such, the ring gear 82 may be disposed closer to the second upper surface 112 than to the first upper surface 110 and the wing 118'.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
    an axle housing that has a center portion that has a bottom wall and that receives a differential, the differential having a ring gear; and
    a ballast insert disposed in the center portion below the differential, wherein the ballast insert includes:
        a lower surface that is disposed on the bottom wall, wherein the lower surface extends along an arc that follows a contour of the bottom wall;
        first and second end surfaces that extend from opposite ends of the lower surface;
        first and second upper surfaces that extend from the first and second end surfaces, respectively; and
        a trench that is disposed between the first and second upper surfaces, wherein the ring gear is received in the trench.

2. The axle assembly of claim 1 wherein the trench extends from the first upper surface to the second upper surface and has a bottom trench surface that is disposed closer to the lower surface than the first and second upper surfaces.

3. The axle assembly of claim 1 wherein the axle housing has a first side wall that facilitates mounting of a differential carrier and a second side wall that is disposed opposite the first side wall, wherein the ballast insert extends from the first side wall to the second side wall.

4. The axle assembly of claim 3 wherein the trench is defined by a first trench side surface, a second trench side surface, and a bottom trench surface that extends from the first trench side surface to the second trench side surface, wherein the bottom trench surface extends along an arc between the first side wall and the second side wall.

5. The axle assembly of claim 4 wherein the ring gear is disposed closer to the second trench side surface than the first trench side surface.

6. The axle assembly of claim 3 wherein the differential carrier is mounted to the axle housing with a fastener, wherein the fastener extends through the first side wall to secure the ballast insert to the axle housing.

7. The axle assembly of claim 6 wherein the ballast insert has an indentation and the fastener is received in the indentation.

8. The axle assembly of claim 7 wherein the ballast insert has a first side surface that faces toward the first side wall, wherein the indentation is disposed in the first side surface and is disposed between and spaced apart from the first upper surface and the lower surface of the ballast insert.

9. The axle assembly of claim 3 further comprising a brace that secures the ballast insert to the axle housing.

10. The axle assembly of claim 9 wherein the brace that extends from the first side wall to the second side wall of the axle housing.

11. The axle assembly of claim 9 wherein the brace is disposed on the first upper surface or the second upper surface of the ballast insert.

12. The axle assembly of claim 11 wherein the first upper surface or the second upper surface has a groove that extends toward the lower surface, wherein the brace is disposed in the groove.

13. The axle assembly of claim 1 further comprising a differential carrier that is mounted to the axle housing, the differential carrier having a bearing support that receives a roller bearing assembly that rotatably supports the differential, wherein the bearing support secures the ballast insert against the axle housing.

14. The axle assembly of claim 13 wherein the bearing support engages the first upper surface or the second upper surface of the ballast insert.

15. An axle assembly comprising:
    an axle housing that has a center portion that receives a differential, the differential having a ring gear; and a ballast insert disposed in the center portion below the differential, wherein the ballast insert includes:
  a lower surface that is disposed on the center portion;
  first and second end surfaces that extend from opposite ends of the lower surface;
  first and second upper surfaces that extend from the first and second end surfaces, respectively; and
  a trench that is disposed between the first and second upper surfaces, wherein the ring gear is received in the trench; and
  a first lubricant trough that is disposed in the first end surface and the first upper surface, wherein the first lubricant trough routes lubricant toward the trench.

16. An axle assembly comprising:
an axle housing having a center portion that receives a differential that has a ring gear; and
a ballast insert disposed in the center portion below the differential, wherein the ballast insert includes:
  a lower surface that is disposed proximate the center portion;
  first and second end surfaces that extend from the lower surface;
  first and second upper surfaces that extend from the first and second end surfaces, respectively;
  a trench that is disposed between the first upper surface and the second upper surface; and
  an intermediate upper surface that extends from the first upper surface to the trench and at least partially defines a wing that extends from the ballast insert.

17. The axle assembly of claim 16 wherein teeth of the ring gear extend toward the wing.

18. The axle assembly of claim 16 wherein the ring gear is disposed further from the wing than the second upper surface.

19. The axle assembly of claim 16 wherein the ballast insert has a first side surface, a second side surface that is disposed opposite the first side surface, and the wing extends outwardly from the second side surface.

20. The axle assembly of claim 19 wherein the intermediate upper surface is disposed further from the lower surface than at least a portion of the second upper surface.

* * * * *

UNITED STATES PATENT AND TRADEMARK OFFICE
CERTIFICATE OF CORRECTION

PATENT NO.        : 9,677,661 B2
APPLICATION NO.   : 14/853309
DATED             : June 13, 2017
INVENTOR(S)       : Andrew Bodary et al.

It is certified that error appears in the above-identified patent and that said Letters Patent is hereby corrected as shown below:

Column 8, Line 46, Claim 10:
After "the brace"
Delete "that".

Signed and Sealed this
Twenty-ninth Day of August, 2017

Joseph Matal
*Performing the Functions and Duties of the*
*Under Secretary of Commerce for Intellectual Property and*
*Director of the United States Patent and Trademark Office*